US008121760B2

(12) United States Patent
Ghoneim et al.

(10) Patent No.: US 8,121,760 B2
(45) Date of Patent: Feb. 21, 2012

(54) ADAPTIVE STEERING CONTROL FOR A MOTOR VEHICLE

(75) Inventors: Youssef Ghoneim, Rochester, MI (US); Veit Held, Bensheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 447 days.

(21) Appl. No.: 12/417,271

(22) Filed: Apr. 2, 2009

(65) Prior Publication Data
US 2009/0254253 A1 Oct. 8, 2009

(30) Foreign Application Priority Data
Apr. 2, 2008 (EP) ..................................... 08006739

(51) Int. Cl.
B62D 5/04 (2006.01)
B62D 5/30 (2006.01)
(52) U.S. Cl. ........................................................ 701/42
(58) Field of Classification Search ...................... 701/42
See application file for complete search history.

(56) References Cited

U.S. PATENT DOCUMENTS

| 5,574,641 | A * | 11/1996 | Kawakami et al. .................. 701/1 |
| 5,709,281 | A * | 1/1998 | Sherwin et al. ................ 180/272 |
| 5,925,082 | A * | 7/1999 | Shimizu et al. .................. 701/41 |
| 7,216,022 | B2 * | 5/2007 | Kynast et al. ...................... 701/1 |
| 7,455,146 | B2 * | 11/2008 | Brosig et al. .................. 180/272 |
| 7,510,038 | B2 * | 3/2009 | Kaufmann et al. ............ 180/169 |
| 7,528,730 | B2 * | 5/2009 | Gut et al. ........................ 340/575 |
| 7,565,230 | B2 * | 7/2009 | Gardner et al. .................. 701/35 |
| 7,592,920 | B2 * | 9/2009 | Kopf et al. ...................... 340/576 |
| 7,711,464 | B2 * | 5/2010 | Kaufmann ........................ 701/41 |
| 7,885,730 | B2 * | 2/2011 | Kaufmann et al. ................ 701/1 |
| 2002/0177935 | A1 | 11/2002 | Winner et al. |
| 2006/0015219 | A1 * | 1/2006 | Kynast et al. ...................... 701/1 |
| 2006/0217860 | A1 * | 9/2006 | Ihara ................................ 701/41 |
| 2006/0217861 | A1 * | 9/2006 | Ihara et al. ........................ 701/41 |
| 2007/0084661 | A1 * | 4/2007 | Brosig et al. .................. 180/272 |
| 2007/0219688 | A1 * | 9/2007 | Gut et al. .......................... 701/41 |
| 2007/0299580 | A1 * | 12/2007 | Lin et al. .......................... 701/41 |
| 2008/0021613 | A1 * | 1/2008 | Hamaguchi et al. ............ 701/41 |
| 2008/0065293 | A1 * | 3/2008 | Placke et al. .................... 701/41 |
| 2008/0189012 | A1 * | 8/2008 | Kaufmann ........................ 701/41 |
| 2009/0076682 | A1 | 3/2009 | Ghoneim |

FOREIGN PATENT DOCUMENTS

| DE | 10114470 A1 | 9/2002 |
| EP | 1350707 A2 | 10/2003 |
| GB | 2372020 A | 8/2002 |
| WO | 2007107360 A1 | 9/2007 |

\* cited by examiner

*Primary Examiner* — Shelley Chen
(74) *Attorney, Agent, or Firm* — Ingrassia Fisher & Lorenz, P.C.

(57) ABSTRACT

An adaptive steering control system is provided for a motor vehicle. The system includes, but is not limited to a sensor for detecting a current value of an operation quantity of a steering wheel, an actor for turning steered wheels and a controller for selecting, according to the speed of the vehicle, a map ($g_1$, $g_2$) assigning to a detected current value of the operation quantity a setpoint value of the operation quantity for the actor, and for issuing a setpoint signal to the actor. The controller is adapted to decide whether the vehicle is in a state of motion requiring a high level of attention from the driver or not, to inhibit a switchover of the map ($g_1$, $g_2$) while the vehicle is in the high attention-requiring state, and to allow such a switchover while the vehicle is not in the high attention-requiring state.

15 Claims, 2 Drawing Sheets

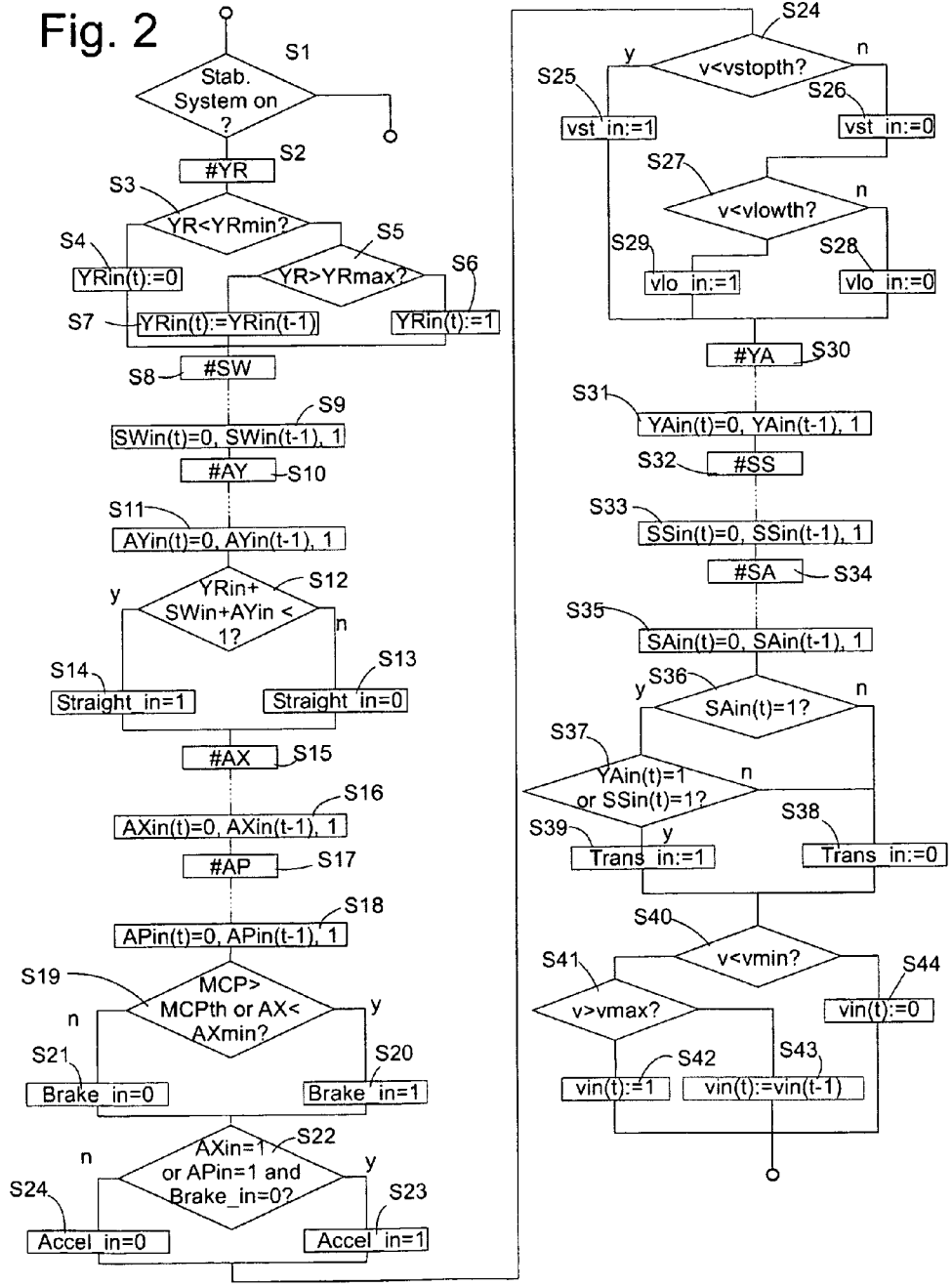

ADAPTIVE STEERING CONTROL FOR A MOTOR VEHICLE

CROSS-REFERENCE TO RELATED APPLICATION

This application claims priority to European Patent Application No. 08006739.0-2425, filed Apr. 2, 2008, which is incorporated herein by reference in its entirety.

TECHNICAL FIELD

The present invention relates to an adaptive steering control system for a motor vehicle.

BACKGROUND

Power steering systems have been known for a long time, in which the torque the driver applies to a steering wheel is amplified and transmitted to the steered wheels, generally the front wheels of the vehicle, by means of an actor (e.g., a hydraulic cylinder, an electric motor or the like). Although these systems have greatly reduced the steering effort for the driver, they were still found not quite satisfactory. When running at high speed (e.g., on a highway), the driver usually applies only small turns to the steering wheel and tends to be uneasy if he hardly feels counter-torque from the steering wheel. This imposes an upper limit for torque amplification in the power steering system which causes a substantial counter-torque to be felt when maneuvering at low speed, where large steering angles are required frequently. More recently, adaptive power steering systems have been introduced in which this problem is overcome by using different torque amplifications at high and low speeds.

A new problem has been created by these adaptive power steering systems which can be extremely irritating for the driver: If the vehicle is braked abruptly while cornering, and its speed drops below the switchover threshold between different torque amplification ratios, the counter-torque experienced by the driver decreases abruptly, giving him the feeling that the vehicle has lost hold on the ground. Since abrupt braking will in most cases occur in critical situations where the driver's attention is absorbed with maneuvers necessary to avoid an accident, there is a risk that he will not react adequately upon the change of counter-torque.

AFS (active front steering) is a technique which allows variation in the transmission ratio of the steering system depending on vehicle speed. An aim of AFS is similar to the adaptive power steering systems mentioned above: to reduce the driver's steering effort in small-radius cornering maneuvers at low speed, while maintaining a well-felt counter-torque at high speed. Here, the problems caused by a switchover between different transmission ratios can be more serious still than with adaptive power steering, since the front wheel road angle associated to a given turning angle of the steering wheel depends on the transmission ratio.

In view of the foregoing, at least one object of the present invention is to provide an adaptive steering control system which will avoid any control operations which might risk taking the driver by surprise. In addition, other objects, desirable features, and characteristics will become apparent from the subsequent summary and detailed description, and the appended claims, taken in conjunction with the accompanying drawings and this background.

SUMMARY

This at least one object, and other objects, desirable features, and characteristics, is achieved by an adaptive steering control system for a motor vehicle, comprising a sensor for detecting a current value of an operation quantity of a steering wheel, an actor for turning steered wheels and a controller for selecting, according to the speed of the vehicle, a map assigning to a detected current value of the operation quantity a setpoint value of the operation quantity for the actor, and for issuing a setpoint signal to the actor, in which the controller is adapted to decide whether the vehicle is in a state of motion requiring a high level of attention from the driver or not and to inhibit a switchover of the map while the vehicle is in the high attention-requiring state.

The operation quantity may be the turning angle of the steering wheel and of the steered wheels, or the torque applied to the steering wheel and to the steered wheels.

In principle, the maps may be quite arbitrary monotonic continuous functions, linear or nonlinear. Preferably the linear term of a map selected at a low vehicle speed is greater than the linear term of a map selected at a high vehicle speed.

Various criteria can be used for judging whether the present state of motion of the vehicle requires a high level of attention from the driver or not. A first convenient criterion is whether the lateral acceleration exceeds a predetermined threshold or not. Preferably, the lateral acceleration may be directly measured by a lateral acceleration sensor connected to the controller. Alternatively, it may be estimated by the controller based on steering wheel angle data (or, equivalently, on road angle data, from both of which the radius of curvature of the vehicle's path may be derived) and the longitudinal velocity of the vehicle. Another suitable criterion is the yaw rate of the vehicle, which may also be obtained from a dedicated sensor connected to the controller.

A particularly preferred criterion is the side-slip rate of the vehicle. While a high yaw rate or a high lateral acceleration alone may be the result of deliberate control measures of the driver and may be well anticipated by him or her, it is likely that a high side-slip rate is not anticipated and will provoke correcting measures from the driver which absorb his/her entire attention.

For estimating the side-slip rate, the controller will preferably use the yaw rate measured by the above-mentioned yaw rate sensor and the lateral acceleration measured by said lateral acceleration sensor.

Another useful criterion for judging whether the vehicle is in a high attention-requiring state is the longitudinal acceleration. A high value thereof, if it positive or negative, is a clear indication that the driver is fully attentive.

Further important criteria are the time derivatives of the steering wheel angle or of the yaw rate. Just like a strong longitudinal acceleration, a high time derivative of the steering wheel angle can only be the result of deliberate steering by the driver. An excessive time derivative of the yaw rate may be the result of steering by the driver, or it may indicate a situation in which control over the vehicle is at least partially lost. In this situation it is all the more important that no unexpected switchover between maps of the steering control system should occur.

The at least one object, and other objects, desirable features and characteristics, is further achieved by a steering control method for a motor vehicle, comprising the iterated steps of:
a) detecting a current value of an operation quantity of a steering wheel;
b) selecting a map assigning to a detected current value of the operation quantity a setpoint value of the operation quantity;
c) issuing a setpoint signal to an actor of steered wheels, comprising the steps of:

d) deciding whether the vehicle is in a state of motion requiring a high level of attention from the driver or not;

e) if it is decided that the vehicle is not in a high attention-requiring state, selecting the map based on vehicle speed; and f) if it is decided that the vehicle is in a high attention-requiring state, re-selecting the map selected in a previous iteration of step e).

The embodiments of invention may further be embodied by a data processor program product comprising a data carrier in which program instructions for enabling a data processor to form the controller of the adaptive steering control system described above or to carry out the above-defined method are recorded in machine-readable form.

BRIEF DESCRIPTION OF THE DRAWINGS

The present invention will hereinafter be described in conjunction with the following drawing figures, wherein like numerals denote like elements, and.

FIG. 2 is a flow chart of a first part of a control process carried out by the controller of the vehicle of FIG. 1.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
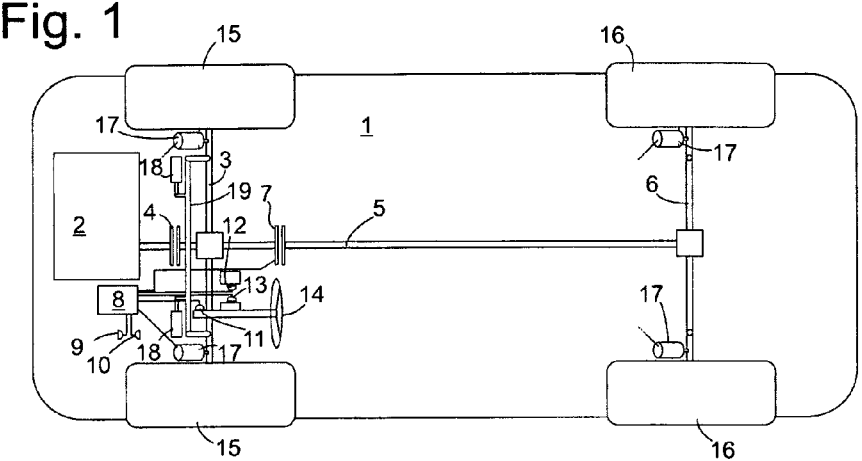
FIG. 1 is a block diagram of a motor vehicle equipped with an adaptive suspension control and an adaptive steering control system according to an embodiment of the invention.

FIG. 1 is a schematic block diagram of a motor vehicle in accordance with an embodiment of the present invention. The vehicle has a combustion engine 2 which drives wheels 15 of a front axle 3 via a first clutch 4. In a drive shaft 5 between front axle 3 and rear axle 6, a second clutch 7 is provided. The second clutch 7 is placed under control of a microprocessor-based controller circuit 8. If the second clutch 7 is opened, the vehicle is driven by the front wheels 15 alone; if it is closed, it is additionally driven by rear wheels 16. The ratio between the torque applied to the front wheels 15 and that applied to the rear wheels 16 can be varied by the controller circuit 8.

Shock absorbers 17 are provided near the wheels 15, 16 on front and rear axles 3, 6. The stiffness of the shock absorbers 17 is variable under control of the controller circuit 8.

A power steering system of vehicle 1 is a steer-by wire system comprising a steering wheel angle sensor 11 placed near the shaft of the steering wheel 14 and connected to controller 8, and hydraulic actuators 19 for displacing a steering rack 18, which are supplied with pressurized hydraulic fluid under the control of controller 8. The controller 8 stores two maps LA=g1(SW), LA=g2(SW) for assigning a road angle LA to a detected steering wheel angle SW. Map g1 is mainly used at low speeds, as will be described in more detail below, whereas g2 is used mainly at high speeds. For any steering wheel angle, g1(SW)≧g2(SW) holds. The maps may be linear functions, or they me be expandable into a Taylor series, the linear term of which is greater for g1 then for g2.

Alternatively, the power steering system may comprise a torque sensor for detecting a torque ST applied to the steering wheel 14 by the driver, and controller 8 stores two maps specifying the torque FT exercised by the actuators 19 for turning the front wheels 15 as a function of the steering wheel torque using a selected one of two maps FT=g1(ST), FT=g2 (ST), g1(ST)≧g2(ST). In this case, a mechanical coupling between the steering wheel, e.g. by means of a conventional pinion on the shaft of steering wheel 14, which engages rack 18, may be provided.

The controller circuit 8 has still other sensors connected to it, such as an acceleration sensor 9 for detecting longitudinal and lateral acceleration of the vehicle 1, a yaw rate sensor 10 or an accelerator pedal sensor 12. The accelerator pedal sensor 12 may replaced by an intake air throttle sensor, not shown, or by a fuel supply rate signal from an electronic engine controller, not shown, since throttle position or fuel rate are usually directly controlled based on the accelerator pedal position.

Further, a brake sensor 13 is provided. This sensor may detect a position of a brake pedal, or it may be a pressure sensor for detecting the pressure of a brake fluid which is used for driving wheel brakes, not shown, at wheels 15, 16, in a manner familiar to one of ordinary skill in the art.

The operation of the controller circuit 8 will be explained referring to the flow charts of FIG. 2 and FIG. 3. These Figs. illustrate two parts of a control process which is carried out repeatedly by the control circuit 8, at regular time intervals or triggered by a substantial change of a quantity related to the motion of the vehicle, as long as the vehicle is moving. The first part of the control process, shown in FIG. 2, relates to an automatic classification of the state of motion of the vehicle 1. The second part, shown in FIG. 3, relates to control measures taken in response to the state of motion identified in the first part of the process. Concurrently with the process of FIG. 2 and FIG. 3, the controller circuit continuously controls the operation of the hydraulic actuators 18 based on input from the steering wheel angle sensor 11 (or, alternatively, based on input from a steering wheel torque sensor) using a currently selected one of maps g1, g2.

In a first step S1, the controller circuit 8 checks whether any electronic stabilizing system which may exist in the vehicle 1, such as a conventional ABS or ESP system, is actively interfering with the vehicle controls. If it is, the process of FIG. 2 is aborted, in order to avoid any undesirable interaction with the electronic stabilizing system, and will be started or triggered again at a later instant or as soon as the stabilizing system goes inactive.

The process of FIG. 2 measures a variety of vehicle motion-related quantities and converts these into binary indices. The way in which this is done is similar for many quantities and will be explained here only once referring to the yaw rate YR from yaw rate sensor 10, it being understood that a similar process is carried out mutatis mutandis for other quantities which will be mentioned later in this description.

In step S2, controller circuit 8 receives a current measured value of the yaw rate YR from yaw rate sensor 10. In step S3, this value YR is compared to a predetermined low threshold YRmin. If YR is found to be below this threshold, step S4 sets the present value of the yaw rate index YRin(t) equal to zero. If YR is above the first threshold, it is compared to a second, higher threshold YRmax in step S5. If YR exceeds this second threshold, the index YRin(t) is set to 1 in step S6. If YR is below the second threshold YRmax, the index YRin(t) is maintained at the value YRin(t−1) it received in a previous iteration of the process (S7).

In a similar way, a steering wheel angle SW is fetched from steering wheel angle sensor 11 in step S8, and, based on a comparison with two thresholds, the present value of a steering wheel index SWin(t) is set to 0, to 1, or is left identical to its previous value SWin(t−1) in step S9.

In the same way, the lateral acceleration AY is read from acceleration sensor 9, and a lateral acceleration index AYin(t) is set according to this reading in step S11.

Step S12 checks whether any of the indices YRin, SWin, AYin determined above is 1, indicating that the vehicle is going through a curve. If so, a straight line driving index Straight_in is set to 0 (S13), if not, it is set to 1 (S14).

In step S15, the current longitudinal acceleration AX is fetched from acceleration sensor 9, and a longitudinal acceleration index AXin(t) is derived there from as described above for YR (S16). In the same way, an index APin(t) indicating whether the accelerator pedal is depressed far enough to accelerate the vehicle is determined in steps S17, S18. An index having the same significance might alternatively be derived from the position of an intake air throttle or from the rate of fuel supply to the engine, too.

Step S19 checks whether the vehicle is in a braking state or not by either comparing the longitudinal acceleration AX of step S15 to a threshold AXmin or by comparing the brake fluid pressure MCP to a threshold MCPth. If one of these thresholds is exceeded, a braking index Brake_in is set to 1 (S20), else to 0 (S21).

If either AXin=1, indicating a substantial acceleration of the vehicle, or APin=1, indicating imminent acceleration, and Brake_in=0, an acceleration index Accel_in is set to 1 (S23), else to 0 (S24).

Based on a comparison of the vehicle velocity v with a very low threshold vstopth, a stop index vst_in is set to 1 (S25), indicating that the vehicle is moving, or to 0 (S26), indicating that is practically standing still. If it is determined that the vehicle is moving, its speed v is compared to another threshold vlowth amounting to a few kilometers per hour. If the threshold is exceeded, indicating that the vehicle is moving in a normal traffic flow, the index vlo_in is set to 0 (S28). If v is below vlowth it is likely that the vehicle is carrying out a difficult maneuver such as moving into and out of a park box, and vlo_in is set to 1 (S29).

In step S30, the yaw acceleration YA, i.e. the time derivative of the yaw rate YR measured in S2, is calculated, and a yaw acceleration index YAin(t) is derived based on comparison with two thresholds in step S31. Step S32 calculates the side-slip rate SS of the vehicle as follows:

$$SS = AY - YR * v \quad (a)$$

Based on the lateral acceleration AY and the yaw rate YR measured in steps S10 and S2, respectively. In the same way as for the other quantities mentioned above, an associated index SSin(t) is obtained in step S33 by comparison with two thresholds. The index SSin is 0 if there is no substantial side-slip, and it is 1 if there is.

Step S34 calculates the time derivative SA of the steering wheel angle SW. In step S35, a steering wheel velocity index SAin(t) is set to 0 if there is no substantial movement of the steering wheel and to 1 if there is.

If SAin(t) is 0 in step S36 (i.e., if the steering wheel is turned slowly or not at all) it is assumed that the vehicle is not in a transient state. This is reflected by transient index Trans_in being set to 0 in S37. If SAin(t) is 1, step S38 further checks whether at least one of indices YAin(t) or SSin(t) is 1. If this condition is fulfilled, the vehicle is assumed to be in a transient state (i.e., Trans_in is set to 1 in S39).

Finally, a binary speed index vin(t) is derived from the longitudinal vehicle speed v in steps S40 to S44. As in case of most of the previously discussed indices, vin(t) is derived by comparison with two thresholds, vmax and vmin, in order to provide hysteresis.

Figure 3:
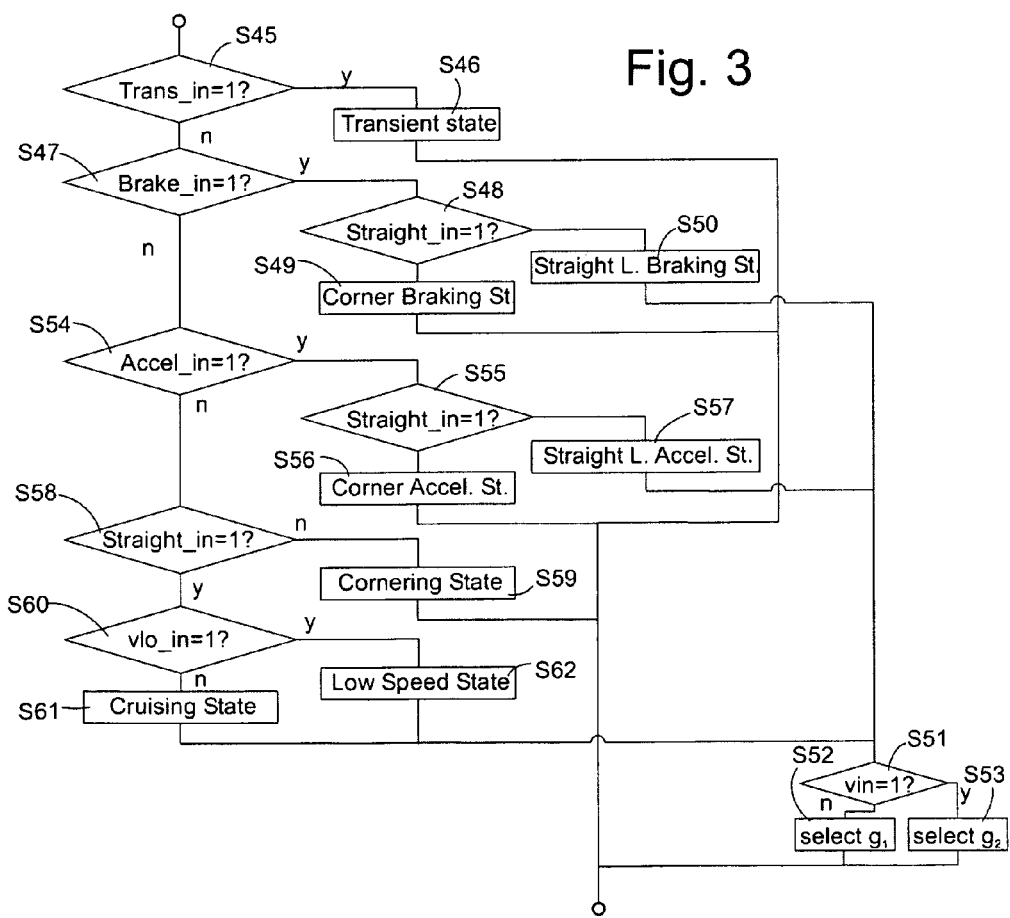
FIG. 3 is a flow chart of a second part of the control process.

The state of motion of the vehicle thus having been evaluated, the controller proceeds to the second part of the process, illustrated in FIG. 3.

If the transient index Trans_in is found to be 1 in S45, the stiffness of the shock absorbers 17 is set to a high value associated to the transient state in S46. Since the transient state corresponds to a situation where the driver is fully occupied by steering and anything which might irritate him should be avoided, the process ends directly after step S46 without switching over between maps g1, g2, whereby the map g1 or g2 that was selected in a previous iteration of the process is effectively re-selected.

If the vehicle is not found to be in the transient state, the brake index Brake_in is checked in step S47. If it is 1, the straight line driving index Straight_in is checked in S48. If it is 1, it is concluded that the vehicle is in a cornering braking state (i.e., it is braking while going through a curve), in S49, and a stiffness value associated to this state is set in the shock absorbers 17. In this case, switching over between maps g1, g2 is not advisable, either, and the process ends.

If Straight_in=0 the vehicle must be in a straight line braking state, and the shock absorbers 17 are set accordingly in S50. In this case, a switchover between maps g1, g2 has no immediate effect on the behavior of the vehicle and may be carried out if appropriate. The method therefore proceeds to step S51, where the speed index vin(t) is evaluated. If vin(t)=0, i.e. if the vehicle is in a low speed range, g1 is selected or re-selected as the map which is used for actuator 18 control; if vin=1, indicating high speed, g2 is selected or re-selected.

If the vehicle is found not to be in a braking state in S47, the method checks for an accelerating state in S54. If Accel_in=1 the straight line driving index Straight_in is checked in step S55, and according to the value thereof the vehicle is determined to be in a cornering accelerating state (S56) or in a straight line accelerating state (S57). In the cornering accelerating state, a switchover of maps g1, g2 is inappropriate, and the process ends; in the straight line accelerating state the process branches to S51, described above.

If the vehicle is not accelerating, either, Straight_in is checked again in step S58, and if it is 1, an appropriate stiffness of the shock absorbers 17 for a cornering state is set in S59. No map switchover takes place.

If the vehicle is not cornering, the speed index vlo_in is referred to in S60 in order to decide whether the vehicle is in a cruising state S61 or in a low speed state S62. In both cases a map switchover can be allowed, so the process branches to S51.

Table 1 below gives examples of maps by which stiffness values of the shock absorbers can be assigned to the various vehicle motion states determined above. These must not be confused with the steering control maps g1, g2 mentioned above. The maps of Table 1 map discrete states onto stiffness values, whereas g1, g2 map continuous values of steering wheel angle SW onto road angles LA of front wheels 15 or continuous values of steering wheel torque ST onto actuator 18 torque. Numbers in table 1 are not quantitative; it is assumed that four different stiffness values referred to as "1" to "4" can be set in the shock absorbers, and that the stiffness increases from "1" to "4". Map A is comfort-oriented; in the cruise mode, the stiffness is set to "1" (i.e., very soft). A low intermediate stiffness "2" is predetermined for low speed and straight line acceleration states, whereas all cornering states, straight line braking and transient states have stiffness "3". Map B is more suitable for a sporty driving style, since the shock absorbers are generally set to a higher stiffness than according to map A. Again, the lowest stiffness, "2", is selected in the cruise mode, and the highest, "4", in the transient, cornering and accelerated cornering states.

TABLE 1

| State | A | B | C1 | C2 | C3 |
|---|---|---|---|---|---|
| Cruise | 1 | 2 | 1 | 1 | 2 |
| Accel. straight line | 2 | 2 | 1 | 2 | 3 |
| Accel. Corner | 3 | 4 | 2 | 2 | 3 |
| Braking straight line | 3 | 3 | 2 | 2 | 3 |
| Braking corner | 3 | 3 | 2 | 2 | 3 |
| Cornering | 3 | 4 | 2 | 2 | 3 |
| Low speed | 2 | 3 | 2 | 2 | 3 |
| Transient | 3 | 4 | 2 | 2 | 3 |

If the controller circuit 8 has a user interface where the driver can specify whether he prefers a comfortable or a sporty driving style, different maps may be used for associating stiffness settings to the various motion states of the vehicle. If the driver selects a comfortable operation mode embodied by map C1, the shock absorbers are set to be soft wherever appropriate (i.e., stiffness "1") is adopted for cruise and straight line accelerating states, whereas all other states are assigned stiffness "2". If the driver wants an intermediate setting, map C2 may be used, which selects the softest setting "1" for the shock absorbers only in the cruise state, and an intermediate value "2" in all others. The shock absorbers are controlled generally to be stiffer by using map C3, which sets stiffness "2" for the cruise mode and "3" for all others.

The process described with respect to FIG. 2 and FIG. 3 allows distinguishing between each of the various states listed in Table 1. Depending on how the different stiffness values are assigned to the various states, and on whether they are needed for deciding whether a switchover between steering control maps g1, g2 is allowed or not, there may be pairs of states between which is not necessary to distinguish. In that case, a skilled person will easily know which of the method steps of FIG. 2 and FIG. 3 may be cancelled.

According to a preferred embodiment, the controller 8 uses the indices obtained in the process of FIG. 2 and FIG. 3 also for controlling clutch 7. While clutch 7 is open in the cruising state, it may be closed in a cornering state in order to reduce oversteer or understeer of the vehicle. The degree of closing and, hence, ratio of distribution of engine torque to front and rear wheels 15, 16 may be different for cornering, accelerated cornering and braking cornering states. Further, the clutch 7 may be closed in the straight line accelerating state, in order to prevent spinning of the tires in case of high acceleration.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An adaptive steering control system for a motor vehicle, comprising:
    a sensor adapted to detect a current value of an operation quantity of a steering wheel;
    an actor adapted to turn steered wheels; and
    a controller adapted to select, according to a speed of the motor vehicle, a map assigning to a detected current value of the operation quantity, a setpoint value of the operation quantity for the actor, and for issuing a setpoint signal to the actor,
    wherein the controller further is adapted to decide whether the motor vehicle is in a state of motion requiring a high level of attention from a driver and to inhibit a switchover of the map (g1, g2) while the motor vehicle is in a high attention-requiring state.

2. The adaptive steering control system of claim 1, wherein the operation quantity is a turning angle of the steering wheel and of a steered wheel.

3. The adaptive steering control system of claim 1, wherein the operation quantity is a torque applied to the steering wheel and to a steered wheel.

4. The adaptive steering control system of claim 1, wherein a linear term of a map (g1) is selected at a low vehicle speed is greater than the linear term of a map s elected at a high vehicle speed.

5. The adaptive steering control system of claim 1, wherein the controller is adapted to decide whether the motor vehicle is in the high attention-requiring state if the lateral acceleration exceeds a predetermined threshold.

6. The adaptive steering control system of claim 5, wherein the controller is connected to a lateral acceleration sensor.

7. The adaptive steering control system of claim 5, wherein the controller is connected to a steering wheel angle sensor and is adapted to estimate a lateral acceleration from a steering wheel angle detected by said sensor and a vehicle longitudinal speed.

8. The adaptive steering control system of claim 1, wherein the controller is connected to a yaw rate sensor and is adapted to decide that the motor vehicle is in the high attention-requiring state if a yaw rate exceeds a predetermined threshold.

9. The adaptive steering control system of claim 1, wherein the controller is adapted to estimate a side-slip rate of the motor vehicle and to decide that the motor vehicle is in the high attention-requiring state if the side-slip rate exceeds a predetermined threshold.

10. The adaptive steering control system of claim 7, wherein the controller is adapted to estimate a side-slip rate from a yaw rate measured by a yaw rate sensor and the lateral acceleration measured by a lateral acceleration sensor.

11. The adaptive steering control system of claim 1, wherein the controller is connected to a longitudinal acceleration sensor and is adapted to decide that the motor vehicle is in the high attention-requiring state if the longitudinal acceleration exceeds a predetermined threshold.

12. The adaptive steering control system of claim 1, wherein the controller is connected to a steering wheel angle sensor and is adapted to decide that the motor vehicle is in the high attention-requiring state if the steering wheel angular velocity exceeds a predetermined threshold.

13. The adaptive steering control system of claim 1, wherein the controller is adapted to determine a time derivative of a yaw rate and to determine that the motor vehicle is in the high attention-requiring state if a time derivative exceeds a predetermined threshold.

14. A steering control method for a motor vehicle, comprising the steps of:
    detecting a current value of an operation quantity of a steering wheel;
    selecting a map assigning to a detected current value of the operation quantity a setpoint value of the operation quantity;

issuing a setpoint signal to an actor of steered wheels, comprising the steps of:

deciding whether the motor vehicle is in a state of motion requiring a high level of attention from a driver;

if it is decided that the motor vehicle is not in a high attention-requiring state, selecting the map based on a speed of the motor; and if it is decided that the motor vehicle is in a high attention-requiring state, re-selecting the map selected in a previous iteration of selecting the map based on the speed of the motor vehicle.

15. A non-transitory computer readable medium embodying a program product, said program product comprising:

an adaptive steering control program for a motor vehicle, the adaptive steering control program for the motor vehicle configured to:

detecting a current value of an operation quantity of a steering wheel;

selecting a map assigning to a detected current value of the operation quantity a setpoint value of the operation quantity;

issuing a setpoint signal to an actor of steered wheels, comprising the steps of:

deciding whether the motor vehicle is in a state of motion requiring a high level of attention from a driver;

if it is decided that the motor vehicle is not in a high attention-requiring state, selecting the map based on a speed of the motor vehicle; and if it is decided that the motor vehicle is in a high attention-requiring state, re-selecting the map selected in a previous iteration of selecting the map based on the speed of the motor vehicle.

* * * * *